July 7, 1953

N. F. HAWTHORNE 2,644,639

CARRIAGE SHIFTING MECHANISM

Filed Aug. 15, 1950

INVENTOR.
NATHANIEL F. HAWTHORNE
BY

Patented July 7, 1953

2,644,639

UNITED STATES PATENT OFFICE 2,644,639

CARRIAGE SHIFTING MECHANISM

Nathaniel F. Hawthorne, Alameda, Calif., assignor to Friden Calculating Machine Co., Inc., a corporation of California Application August 15, 1950, Serial No. 179,479

9 Claims. (Cl. 235—63)

This invention relates to calculating machines, and is more particularly concerned with the provision of improved mechanism for shifting the register carriage thereof selectively in either direction.

It is an important object of the present invention, therefore, to provide for the register carriage of a calculating machine an ordinal shifting mechanism which is relatively smooth and quiet in operation even though the carriage shifting operation is power-operated and is performed at a relatively rapid rate of speed.

It is also an object of the invention to produce an improved mechanism for ordinally shifting the register carriage of a calculating machine selectively in either direction by a relatively smooth shifting movement, which mechanism is also operable to terminate the shifting movement of the carriage in any desired ordinal position without causing objectionable noise or vibration.

It is another object of the invention to provide a mechanism for smoothly and quietly terminating high speed shifting movement of the ordinally shiftable carriage in a calculating machine, which mechanism is also operable to prevent overtravel of such a shiftable register carriage beyond its true ordinal position by positively locking the same centrally in the selected ordinal position as soon as the desired shifting movement thereof has been completed.

It is also an object of the invention to produce a relatively quiet and vibration-free mechanism for positively stopping the ordinal shifting movement of a calculating machine carriage in such a manner as to substantially prevent inertia forces from causing overtravel of the carriage beyond its selected ordinal position.

Further objects are to provide a construction of maximum simplicity, economy, and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention, and that the invention is capable of modification and change and comprehends other details of construction without departing from the spirit thereof or the scope of the appended claims.

Referring to the drawings.

General arrangement

Figure 1:
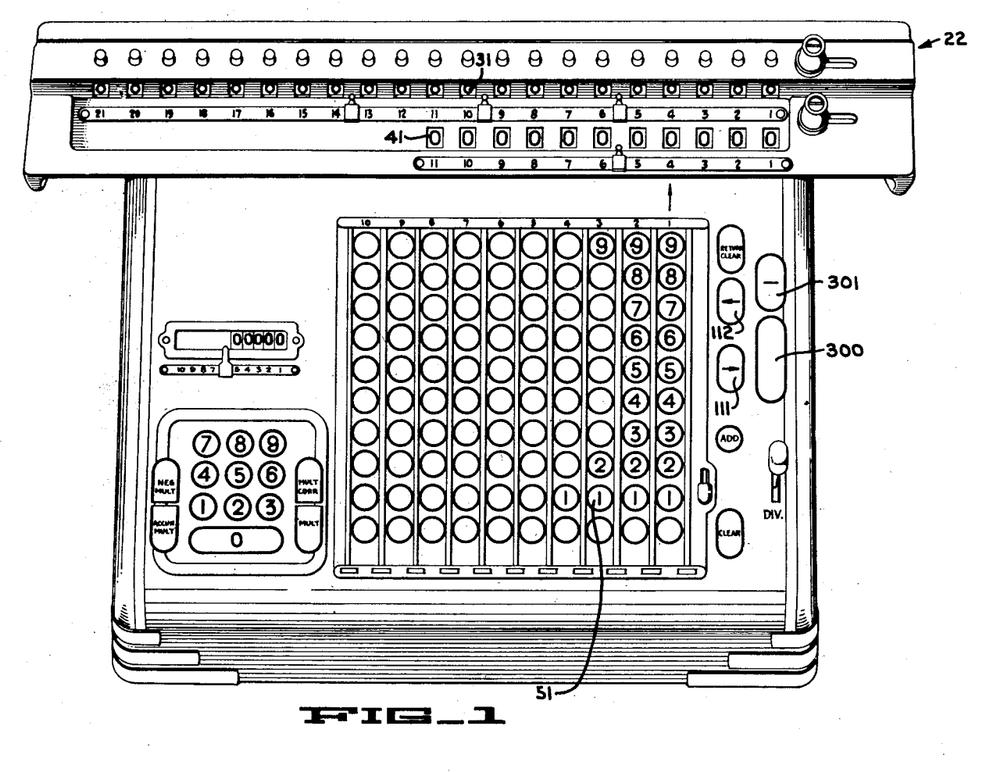
Fig. 1 is a plan view of a standard Friden calculating machine showing the keyboard and control panel arrangement thereof.

The calculating machine selected for illustration in conjunction with the instant invention is of the general type described in the patent to Carl M. Friden No. 2,315,780, issued April 6, 1943, wherein similar parts are identified by the same reference numerals as in the present disclosure. The general arrangement and operation of such a standard Friden calculating machine is well known, and includes a shiftable register carriage 22, shown in Figs. 1 and 2, which serves to mount the numeral wheels of a revolutions counter 41 (Fig. 1) having a suitable actuating and tens-transfer means such as is described in Patent No. 2,229,889, issued to Carl M. Friden on January 28, 1941. This carriage 22 also mounts a plurality of ordinally arranged accumulator dials 31 provided with a tens-transfer mechanism of known design, which dials 31 are suitably journalled in carriage 22 and are adapted for actuation through suitable plus-minus gearing 73, 74 (Fig. 2) having a sliding driving engagement with a square shaft 71 in each order and a reversing engagement with a pinion gear 33 secured to the lower end of each of the accumulator dial shafts 32. As is fully shown and described in the afore-mentioned Friden Patent No. 2,315,780, a pair of value selecting gears are slidably supported for rotation with the square actuating shafts 71 in each order, which gears receive from their associated selection slides differential increments of movement which bear a predetermined relationship to the value of the keyboard amount key 51 (Fig. 1) which has been depressed in that order. Hence, the stepped teeth on the associated actuating cylinders 54 (Fig. 5) rotate the corresponding square shafts 71 to an extent dependent upon the values of the particular amount keys 51 which have been depressed. The sign character of registration for the accumulator register dials 31 is controlled by shifting the plus-minus gearing 73, 74 under control of a strap or gate 75 mounted by suitable upright arms on a transverse rockable shaft 76 (Figs. 2 and 5) which may be controlled by the respective plus and minus keys 300, 301 (Fig. 1) or in any other convenient manner in performing calculating operations.

Figures 3, 4:
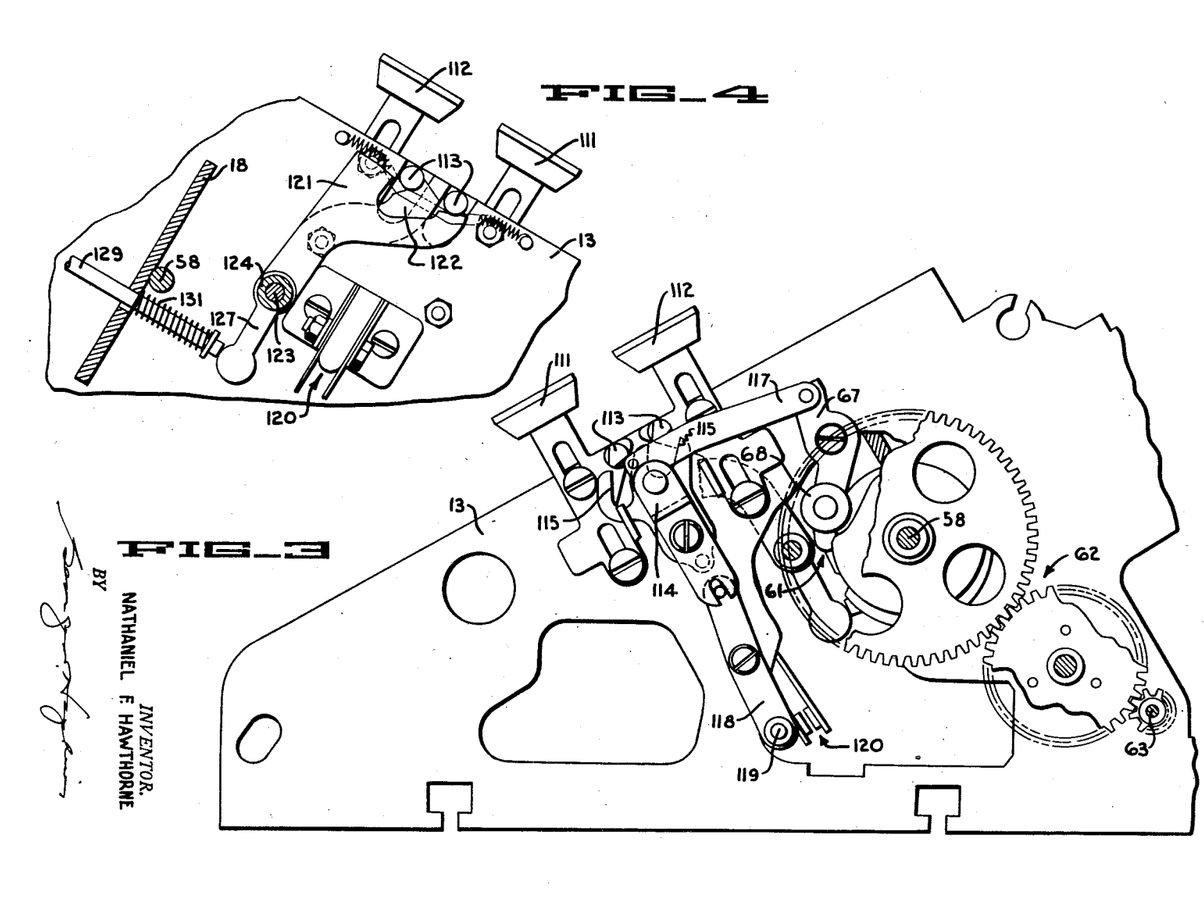
Fig. 3 is a right side view of the control plate taken along the lines 3—3 in Fig. 5, showing the switch and main clutch control mechanisms.
Fig. 4 is a detailed elevational view of the shift control mechanism taken along lines 4—4 in Fig. 5 and looking in the direction of the arrows.
Figure 5:
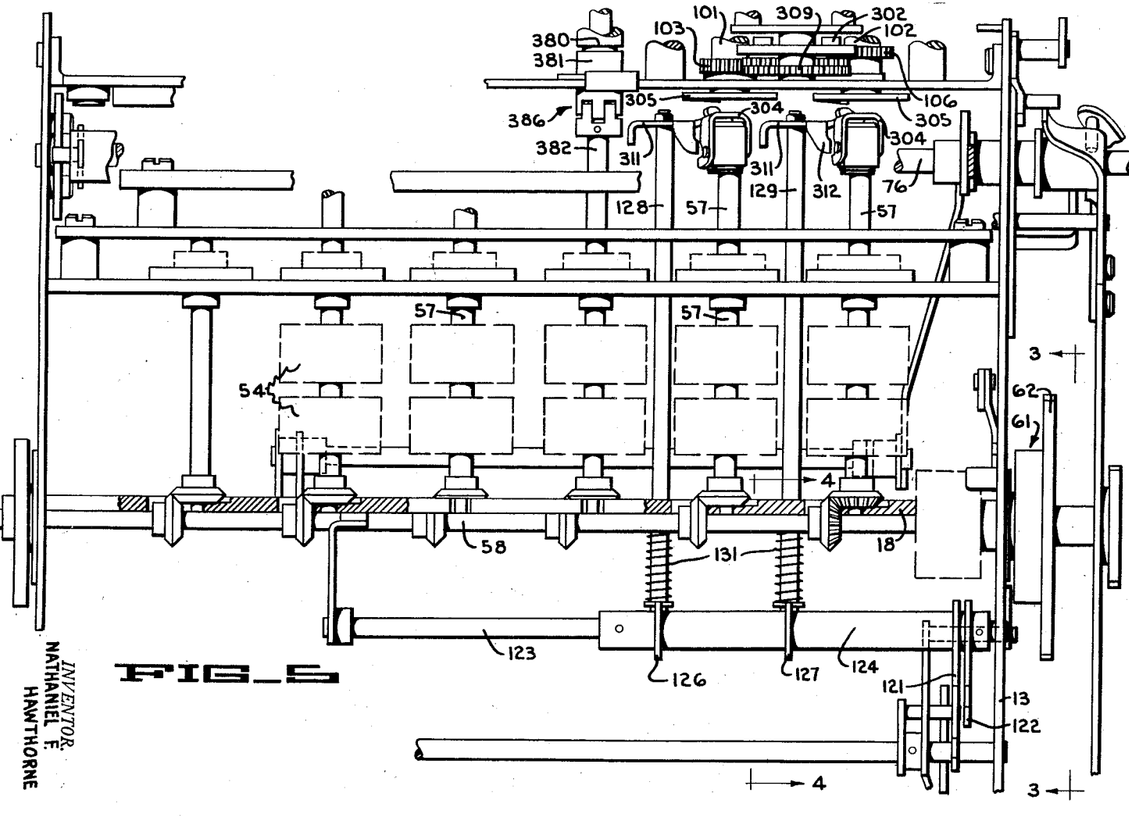
Fig. 5 is a plan view of the machine with certain parts removed to more clearly show the construction and arrangement of the carriage shift control mechanism.

As shown in Figs. 3 and 5, transverse drive shaft 58 and the associated unidirectional actuating shafts 57 are driven cyclically from a suitable electric motor through main clutch 61 (Figs. 3 and 5) which is driven by suitable gearing 62 from the motor output shaft 63. Clutch 61 is engaged or disengaged by the pivotal movement of a clutch control lever 67 (Fig. 3) which is pivotally mounted on the side plate of the machine. During rotation of this main clutch, control lever 67 and the parts associated therewith are maintained in active position by a roller 68 carried by lever 67 and adapted for engagement with the periphery of the clutch 61 in such a manner that the control lever 67 can only move to clutch disengaging position whenever the machine is in the full-cycle position, as is fully shown and described in Patent No. 2,229,889, issued to Carl M. Friden on January 28, 1941.

*Carriage shifting mechanism*

Means are provided for shifting the carriage in either direction from one ordinal position to another by power-driven means controlled by manually operable keys. For this purpose carriage 22 is provided with a rack 82 (Figs. 6 and 7) suitably mounted along the rear edge thereof, which rack 82 has a plurality of involute gear shift teeth 83 formed in the lower edge thereof and spaced apart a distance equal to the ordinal spacing of the machine. These rack teeth 83 are adapted to engage with the similarly shaped involute teeth 85 on a coacting 4-tooth carriage shift gear 303, journalled in rear bearing plate 329 and rear frame bracket 392 affixed thereto, and rotated by means to be hereinafter described so as to effect a lateral shifting movement of the carriage. Thus, a one-fourth or 90° rotation of the carriage shift gear 303 moves rack 82 laterally so as to effect one ordinal movement of the shiftable carriage 22. At its ends the shift rack 82 is provided with a pair of oppositely disposed yieldable pawls, not shown, which are adapted to be rocked by the pins 302 on the involute gear teeth 85 (Fig. 7) against an associated return spring so as to prevent the attempted shifting of the register carriage beyond the lowest and highest ordinal positions thereof, as is fully shown and described in Carl M. Friden Patent No. 2,294,083, issued August 25, 1942.

Figure 7:
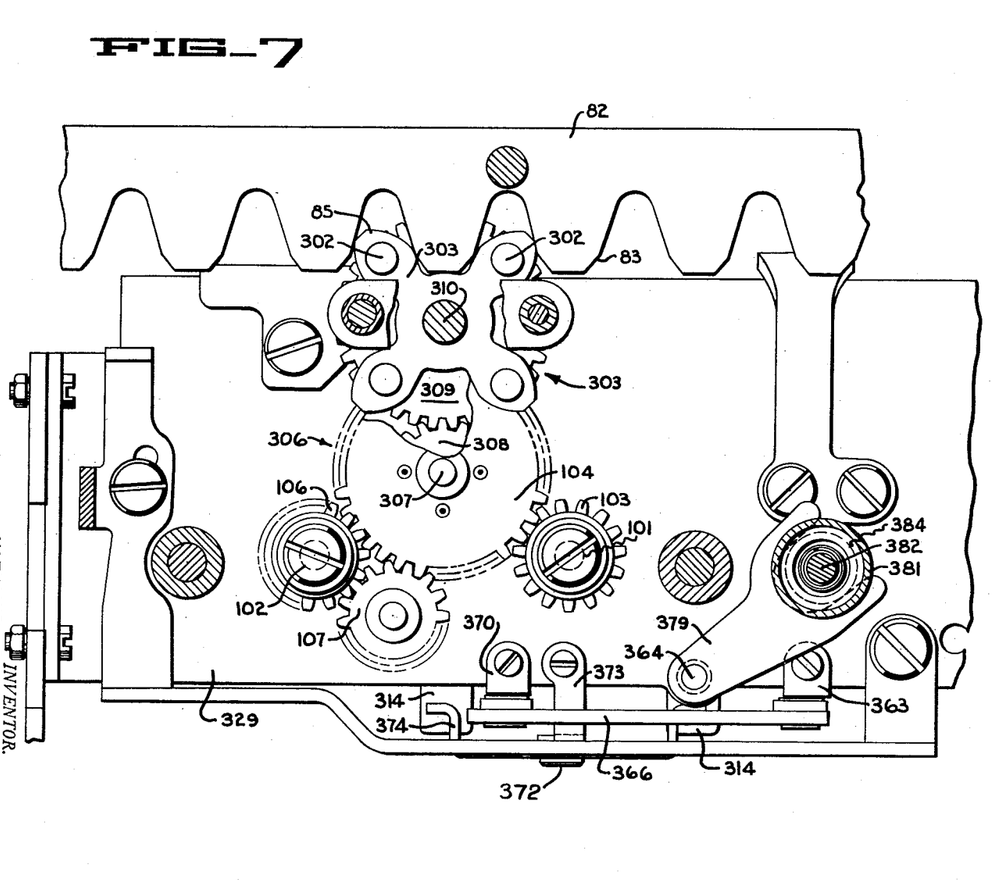
Fig. 7 is a sectional view taken along the lines 7—7 in Fig. 2 showing details of the carriage shifting mechanism.

In order to rotate the carriage shift gear 303 in either direction by selectively operable drive connections from the actuating means of the machine, the lowest order actuating shafts 57 (Fig. 5) are extended rearwardly and have respective shift clutch drivers 304, preferably of the type shown and described in Morton P. Matthew application S. N. 180,584, filed August 21, 1950, which drivers are pivotally connected to the ends of the adjacent shafts 57 in such a manner as to form a readily controllable clutching and declutching engagement with the associated clutch follower assemblies 305 on the respective gear sleeves 101, 102. Gear sleeve 101 is provided with a gear 103 which meshes with a driven gear 104 on the intermediate gear assembly 306 (Fig. 7). Gear sleeve 102 has offset axially from gear 104 a gear 106 which meshes with a relatively wide reverse idler gear 107 suitably journalled on the frame and meshing with the gear 104. This gear 104 forms part of the unitary compound gear assembly 306 (Figs. 2 and 7) which also includes the short shaft 307 and a smaller concentric gear 308 adapted to engage with a shift drive gear 309 mounted on a short drive shaft 310 which is connected at its other end to the carriage shift gear 303. Thus, rotation of the gear sleeves 101 and 102 in a clockwise direction, as viewed in Fig. 7, causes shifting of the carriage 22 to the right and to the left, respectively, as viewed from the rear of the calculating machine.

Manually operable control means are provided to enable shifting the carriage in either direction through one or more ordinal spaces. Shift keys 111, 112 (Figs. 1, 3 and 4) are depressible to initiate shifting of the carriage to the right and left, respectively, as viewed from the front of the machine (to the left and right, respectively, in Fig. 6). Depression of either shift key 111, 112 serves to enable the associated drive connection as well as to engage the clutch and energize the motor. Keys 111 and 112 are suitably mounted for endwise movement on the frame plate 13 and carry respective pins 113 associated with lever 114 (Fig. 3) pivoted on the frame plate 13. One part of lever 114 has inclined cam slots 115 arranged for cooperation with the respective pins 113. Lever 114 is connected by link 117 with the clutch control lever 67 (Fig. 3) so that the main clutch 61 is engaged upon depression of either shift key. At its lower end lever 114 is pivotally connected with lever 118 also suitably pivoted on the frame and carrying an insulated pin 119 operatively related to close the contacts 120 of the motor circuit upon depression of either shift key.

To enable the respective drive connections from the actuating shafts 57 to the carriage shifting mechanism upon depression of a shift key, the respective pins 113 (Fig. 4) overlie levers 121 and 122 secured on concentric sleeve 124 and shaft 123. Shaft 123 and sleeve 124 carry similar depending arms 126 and 127, respectively, (Figs. 4 and 5) having their lower ends disposed in front of the respective shift control rods 128 and 129, which rods have return springs 131 associated therewith to maintain them normally in inactive position. At their rearward ends, each of the rods 128 and 129 carries a controller 311 adapted to coact with the associated shift clutch driver 304 so that upon depression of either shift key 111, 112 the associated drive connection is established, preferably as described in Morton P. Matthew application S. N. 180,584, filed August 21, 1950, at the same time that the main clutch 61 is engaged and the motor is energized. Thus, by the selective depression of shift keys 111 and 112, carriage shift gear 303 can be rotated in either direction to effect ordinal shifting of the carriage.

Shift stopping mechanism

Figure 2:
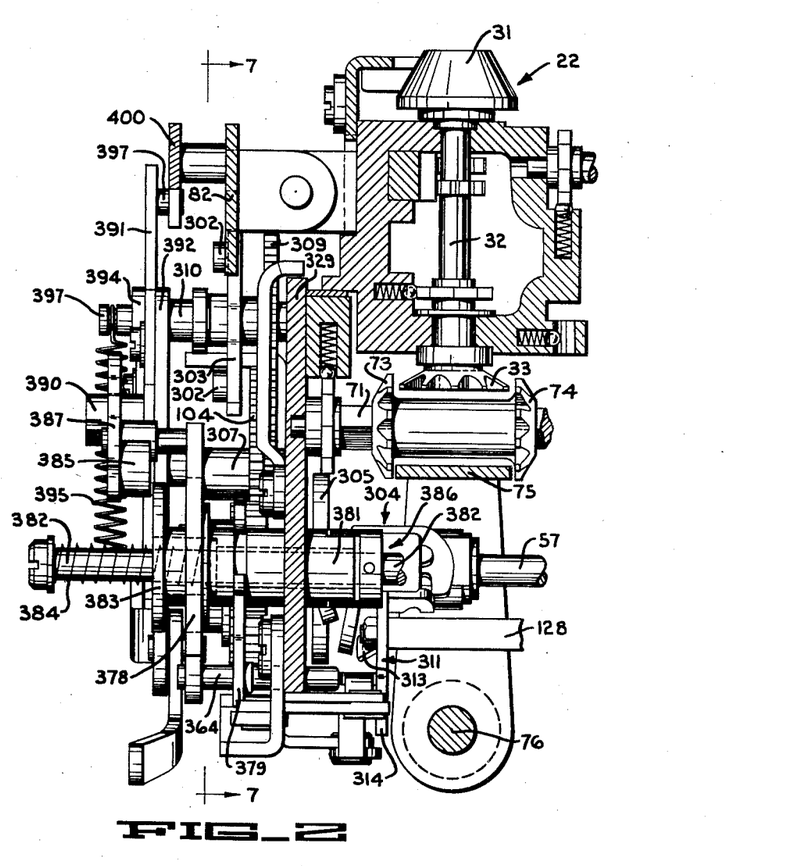
Fig. 2 is a sectional view of the carriage shift mechanism taken along the lines 2—2 in Fig. 6 and looking in the direction of the arrows.
Figure 8:
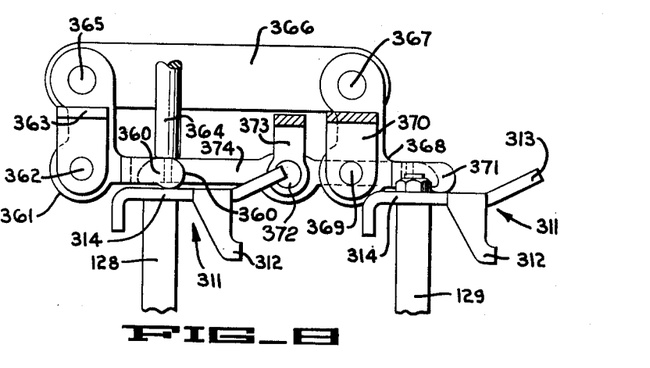
Fig. 8 is an enlarged plan view showing details of the shift control mechanism.

Mechanism is provided for smoothly stopping and terminating the carriage shift by positively arresting the forward movement of the shiftable carriage before the inertia forces acting thereon have carried the carriage beyond its home or selected ordinal position. The carriage stopping mechanism now to be described does not rely upon springs to perform the mechanical work required for stopping the lateral shifting movement of the carriage, thereby substantially reducing the load on the shift drive mechanism and substantially eliminating any tendency of the carriage to pull ahead of the shift drive, with the result that a smooth and relatively quiet carriage shifting action is achieved during both single and multiple order shifting operations. It will be recalled that as the shift keys 111, 112 are selectively depressed the corresponding clutch driver 304 is engaged with its associated clutch follower assembly 305 (Fig. 5) and the main clutch 61 and switch contacts 120 are closed so that the carriage 22 is shifted laterally as desired. The shift control rods 128, 129 are provided at their rear ends with shift controllers 311 (Figs. 2 and 8), each having thereon a forwardly extending clutch disengaging dog 312, an angularly outwardly extending clutch engaging ear 313, and a downwardly disposed vertical shove dog 314 (see also Fig. 2). As the controller 311 associated with left shift control rod 128 is moved rearwardly to effect engagement of the respective clutch driver 304 with the associated shift clutch follower assembly 305 (Fig. 5), the downwardly depending shove dog 314 thereon acts through an interponent arm 360 on bellcrank 361 (Fig. 8) to move rearwardly a shift release cam control pin 364. This bellcrank 361 is pivotally supported as at 362 on a right angle bracket extension 363 carried by the rear bearing plate of the machine. The rearwardly extending arm of bellcrank 361 is pivotally connected at 365 to one end of an interconnecting link 366 (Figs. 6, 7 and 8) having its other end pivoted at 367 on another bellcrank 368 fulcrumed at 369 on a right angle support bracket 370 secured to the rear bearing plate 329. An arm 371 extending laterally outwardly from bellcrank 368 is adapted to coact with the downwardly depending shove dog 314 on the controller 311 associated with shift control rod 129. Hence, bellcranks 361, 368 are simultaneously rocked whenever shift control rod 128 or 129 is moved rearwardly so as to close the normally open shift clutch by engaging the associated shift clutch driver 294 with the immediately adjacent shift clutch follower assembly 305 (Figs. 2 and 5). Also pivoted at 372 on a rigth angle bracket 373 suitably secured to the rear bearing plate 329 is a shift interlock lever 374 (Figs. 7 and 8) having its opposing ends adapted to coact with the controller shove dogs 314 associated with the respective shift control rods 128, 129 so that only one such control rod can be moved rearwardly to shift clutch engaging position at a time. It will thus be apparent that as right shift control rod 129 is moved rearwardly the bellcranks 368, 361 are rocked counterclockwise (Fig. 8) so that arm 360 on bellcrank 361 moves cam control pin 364 rearwardly in the same manner as is directly caused by the rearward movement of left shift control rod 128 (Fig. 8).

Figure 6:
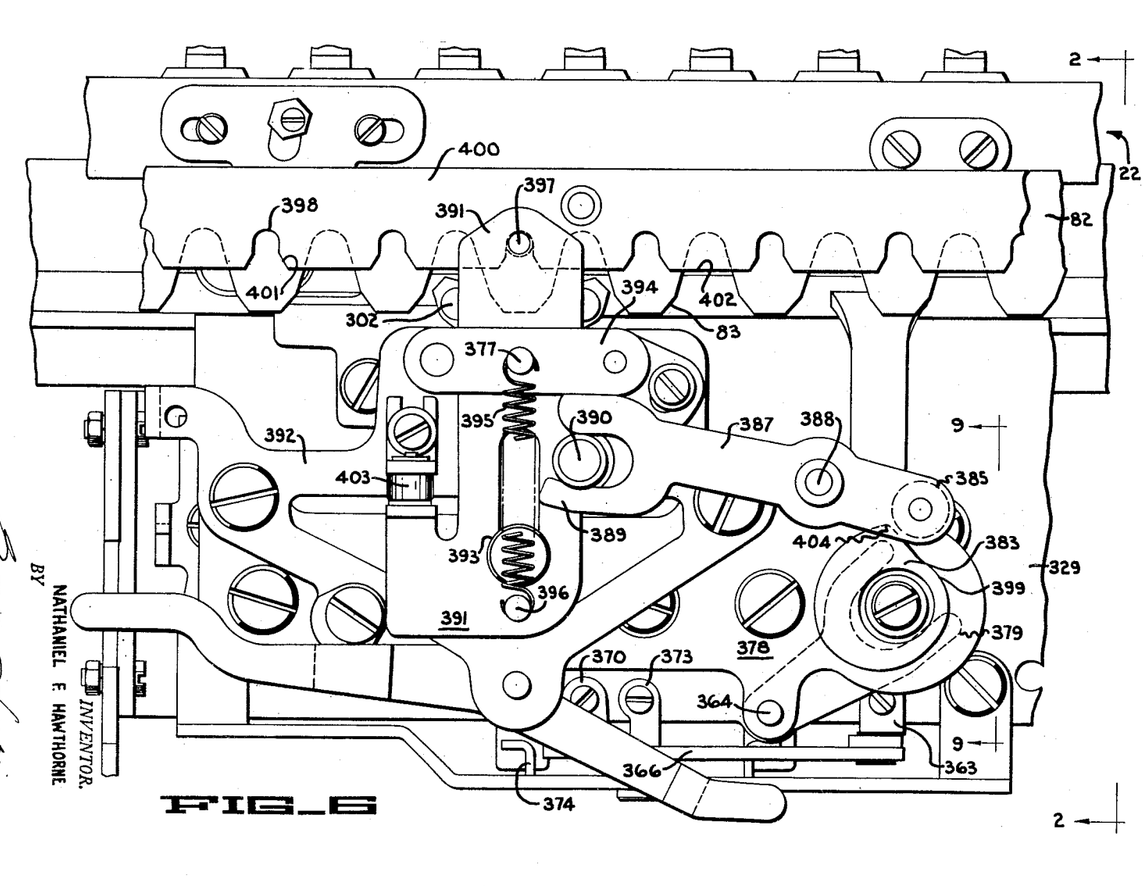
Fig. 6 is an enlarged rear view of the positive shift stopping mechanism.
Figures 9, 10:
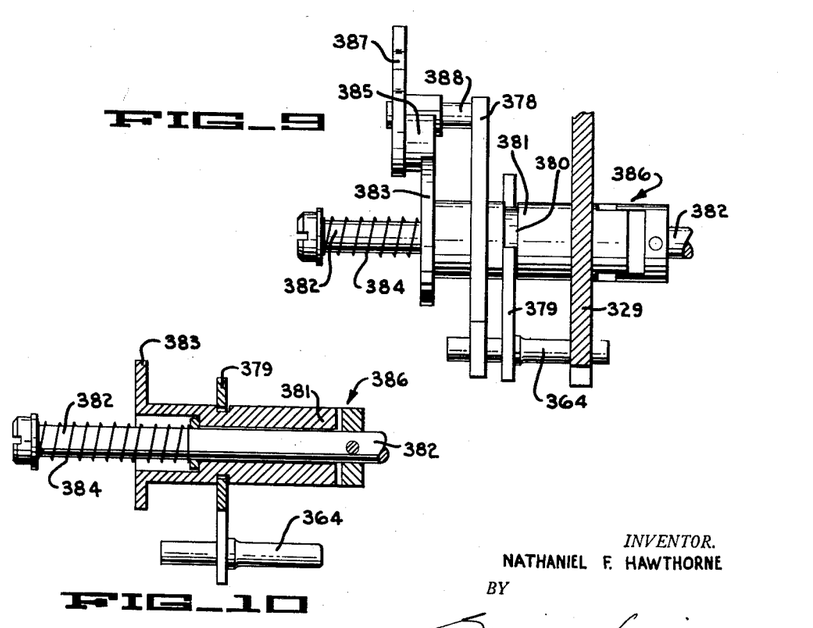
Fig. 9 is an elevation view taken along the lines 9—9 in Fig. 6 showing details of the control cam associated with the carriage stopping mechanism.
Fig. 10 is a cross-sectional view of a portion of the control cam mechanism shown in Fig. 9.

Referring now to Figs. 6 and 9, it will be observed that cam control pin 364 extends through and projects beyond suitably aligned holes in the rear bearing plate 329 and in a parallel rear backing plate 378 affixed thereto and suitably spaced therefrom. This pin 364 is supported for free axial movement by the plates 329, 378. The pin carries an upwardly extending shift yoke 379, the bifurcated upper end of which engages with a suitable annular recess 380 (Figs. 5 and 9) in a shiftable collar 381 which is slidably and rotatably journalled in the plates 329, 378. Collar 381 is also disposed concentric with the axis of a rearwardly extending drive shaft 382 which is provided on the third order actuator shaft, and collar 381 is provided at its rearward end with a shift release cam 383. The cam and collar are urged inwardly as a unit by the helical compression spring 384 so as to normally retain plate cam 383 out of the plane of its associated cam follower 385. A coupling dog 386 (Figs. 5 and 9) on shaft 382 is gripped by corresponding slots in collar 381 so as to form a sliding but constant torque transmitting engagement between the actuator shaft extension 382 and the shiftable collar 381 which carries the plate 383. Hence, cam 383 rotates with shaft 382 at all times, not only when the cam is urged forwardly to its normally ineffective position by spring 384, but also whenever pin 364 and shift plate 379 move collar 381 rearwardly to bring plate cam 383, against the compression of spring 384, into its active position within the plane of the cam follower 385, as shown in Fig. 9.

Referring now to Figs. 2 and 6, cam follower 385 is supported by one arm of a lever 387 which is pivoted at 388. Lever 387 has a bifurcated outer end 389 which engages a pin 390 on a vertically movable slide plate 391 slidably supported on the rear frame bracket 392 by the pin-and-slot connection 393 and the strap plate 394. A tension spring 395 having one end secured to a pin 396 on slide plate 391 and its other end anchored to a pin 377 on strap plate 394 tends to urge slide plate 391 upwardly against its resilient limiting stop 403 (Fig. 6) so that the pin 397 provided at the upper end of slide plate 391 is urged into a coacting slot 398 provided in the carriage stop rack 400. This stop rack, which is secured to the shiftable carriage 22 in a position substantially parallel to the shift rack 82 (Figs. 2 and 6), is provided with a plurality of ordinally spaced grooves or slots 398 having suitably rounded or chamfered outer edges 401 (Fig. 6) joined by a depressed curved portion formed substantially to the configuration of the coacting stop pin 397 on slide 391. Although the linear spacing of the slots or grooves 398 corresponds to that of the involute teeth 83 on shift rack 82, these slots have a staggered relationship with respect thereto, so that the slots are substantially symmetrically disposed with respect to the vertical axis of the involute teeth 83 on rack 82. A substantially flat horizontal edge 402 (Fig. 6) joins the chamfered edges 401 and extends laterally between adjacent slots 398.

The shape of the shift release cam 383 (Fig. 6) is such that the high point 404 of the cam is positioned immediately adjacent to but not in contact with the cam follower 385 whenever the machine is in the full-cycle position shown in Fig. 6, at which time the carriage stop slide 391 is in its uppermost position and the stop pin 397 is retained by spring 395 in intimate contact with the coacting slot 398 in the carriage stop rack 400. Whenever one of the shift control rods 128, 129 is moved rearwardly, however, so as to close the associated shift clutch and move the controller shove dog 314 into operative engagement with the associated bellcrank 361 or 360 (Fig. 8), in the manner previously described, the cam control pin is also moved rearwardly. The rearward movement thus imparted to pin 364 acts through shift plate 379 to move collar 381 rearwardly (Fig. 9), thereby moving the shift release cam 383 into the plane of the cam follower 385 on the shift release lever 387. At the beginning of the shift cycle the high point 404 of cam 383 moves into engagement with roller 385 so as to rock lever 387 counter-clockwise (Fig. 6), thereby depressing slide 391 so that the stop pin 397 carried thereby is moved out of engagement with the coacting slot 398 on the carriage stop rack 400. The Matthew clutch shown herein, and the use of which is preferred in connection with my invention, has a lag of about 15° from the beginning of rotation of the actuator shafts 57 and 382 before the clutch driver 304 engages the clutch follower 305. During this period of lag in the clutch, the cam 383 will have rotated approximately 15° and therefore the high point 404 will have engaged cam follower roller 385 and rocked lever 387 to its extreme counter-clockwise position. In this position the pin 397 will be completely withdrawn from the coacting slot 398. Thus, during the first few degrees of movement of the actuator shafts, and before the shift clutch begins to shift the carriage, the pin 397 is disengaged from the slot 398. At approximately half way through the cycle the gradual drop of the cam from its high point 404 to its low point 399 will permit the slide 391 to rise under the force of its spring 395. Thus, at approximately the midpoint of a cycle the pin 397 will come into intimate contact with the coacting horizontal surface 402 between adjacent slots, and thereafter the rack 400 will slide along the pin 397 as the carriage shifts to the next ordinal position. In a single cycle shifting operation, or in the last shifting cycle of a multiple order shifting operation, the pin 397 will enter the chamfered edge 401 of the next adjacent slot, shortly before the end of the cycle, whereupon the spring 395 will snap the pin 397 into the slot 398 and positively centralize the carriage. In this manner the pin 397 is positioned into the next ordinal recess 398 to terminate the carriage shift before the inertia of the shiftable carriage can cause it to travel beyond its ordinal position.

During a multiple order shifting operation the stop pin 397 will be prevented from moving into the slot 398, so that the shift will be noiseless and smooth. It will be recalled that the cam 383 is preferably about 15° ahead of the operation of the shift clutch. Therefore in each ordinal stepping of the carriage the pin 397 will be enabled to engage the horizontal edge 402 of the centralizing rack 400 at approximately the midpoint of the cycle, as before. However, the high point 404 of the cam 383 will again rock the arm 387 (counter-clockwise, Fig. 6) at approximately the instant when the pin 397 approaches the leading chamfered edge 401. Thus, the slide 391 and pin 397 are rocked downwardly away from rack 400 the instant before the pin 397 would normally be thrust into the slot 398. By this means the pin 397 is prevented from centralizing the carriage at each ordinal step of a multiorder shift. However, in the final cycle, as the shift rods 128 or 129 will have been released, thereby permitting the cam 383 to be pushed out of the plane of roller 385, prior to the end of a cycle, the pin will be enabled to enter the associated slot 398 at the proper time.

It will also be observed that spring 395 performs no centralizing work, but that this spring tends to enable active positive engagement between the top pin 397 and the coacting slots 398 on the carriage stop rack 400. Hence, spring 395 imposes substantially no additional load on the clutch driving and driven members or other components of the carriage shifting mechanism, and substantially eliminates any tendency of the shiftable carriage 22 to pull ahead of the associated carriage shift drive.

I claim:

1. In a calculating machine having a frame, a shiftable register carriage, means for shifting the said carriage including a shift rack mounted on the said carriage and a rotatable gear assembly mounted on said frame and meshing with said rack, and cyclically operable power means, connecting means for driving the said gear assembly and the said carriage selectively in either direction by said power means, a control device for controlling operation of said connecting means, a centralizing mechanism for the said carriage including an ordinally slotted stop plate on the said carriage and a coacting stopping member on the said frame, resilient means for biasing the said stopping member into carriage centralizing engagement with the said stop plate, means for disabling the said centralizing mechanism by moving the said slide out of the range of the said stop plate, and means controlled by said control device for connecting said disabling means to said power means immediately prior to operation of said connecting means to effect shifting of said carriage.

2. In a calculating machine having a frame, a shiftable register carriage, means for shifting the said carriage including a shift rack on the said carriage and a reversible gear assembly mounted on said frame and meshing with said rack, driving means including a normally open shift clutch adapted to be closed to cause the said gear assembly to shift the said carriage laterally in the desired direction and a shift clutch control member, a centralizing and stopping mechanism for the said carriage including an ordinally slotted stop plate on the said carriage and a coacting stopping slide on the said frame, the said slide being normally spring-urged into shift stopping and centralizing engagement with the said stop plate, cam-operated means operable to withdraw the said slide from engagement with said plate, and means positioned by said clutch control member for operatively connecting said cam-operated means to said driving means prior to the operation of said clutch.

3. In a calculating machine, the combination which comprises a shiftable register carriage, a shift operating rack and a stop plate on said carriage, the said stop plate having ordinally spaced slots thereon corresponding to the teeth of the said rack, a reversible carriage drive gear assembly for operating the said shift operating rack, driving means including a shift clutch operable to cause the said reversible gear assembly to shift the said carriage laterally in the desired direction, a clutch control member for operating said shift clutch, a locking member normally positioned and maintained in positive stopping and locking engagement with a predetermined one of the said slots so as to stop and retain the shiftable carriage in its selected ordinal position, and mechanism controlled by the clutch control member and driven by said driving means for moving the said locking member out of the operative range of the said stop plate prior to the closing of the shift clutch.

4. In a calculating machine, the combination which comprises a shiftable register carriage provided with a shift operating rack and a stop plate, the said stop plate having ordinally spaced slots thereon, a reversible carriage drive gear assembly for operating the said shift rack, driving means including a pair of normally open shift clutches adapted to be selectively closed to cause the said reversible gear assembly to shift the said carriage laterally in either direction, a control member for each clutch, a shift control member normally maintained in active engagement with the slots of said slotted stop plate, a withdrawing mechanism operable to move said shift control member from engagement with said stop plate, and an interponent operated by either of said clutch control members for operatively connecting said last-mentioned mechanism to said driving means prior to the operation of the respective clutch.

5. In a calculating machine, the combination which comprises a shiftable register carriage provided with a longitudinal shift rack and a stop plate disposed substantially parallel therewith, the said stop plate having ordinally spaced slots thereon corresponding to the teeth on the said shift rack, a reversible gear carriage drive assembly for operating the said shift rack, driving means including a pair of normally open shift clutches having a lost motion connection therein and adapted to be selectively closed to cause the said reversible gear assembly to shift the said carriage laterally in either direction, a clutch control member for each such clutch, a positionable shift control member normally maintained in positive engagement with a predetermined slot in the associated stop plate for terminating the carriage shifting movement in the selected ordinal position, a normally disconnected mechanism cyclically operated by the said driving means for moving the said shift control member out of engagement with the slots of said stop plate, and means operated by either of said clutch control members for operatively connecting said mechanism to said shift control member prior to the operation of its respective clutch.

6. In a calculating machine, the combination which comprises a shiftable register carriage, a longitudinally disposed shift operating rack on the said carriage, a longitudinally disposed stop plate supported on the said carriage having wide teeth and relatively narrow ordinally spaced vertical slots therebetween, the said slots being arranged to correspond with the teeth on the said operating rack, a reversible gear carriage drive assembly for operating the said shift rack, driving means including a pair of normally open shift clutches adapted to be selectively closed for enabling the said reversible gear assembly to shift the said carriage laterally in either direction, a vertically movable shift control plate having a pin thereon adapted to be normally maintained in shift stopping and locking engagement with a slot on the said stop plate corresponding to the selected ordinal position of the said carriage, and mechanism for moving the said control plate and pin thereon out of the operative range of the said stop rack as long as one of the said shift clutches remains closed for controlling traverse of the said carriage during a shift operation.

7. In a calculating machine, the combination which comprises a shiftable register carriage, a longitudinally disposed shift rack on the said carriage, a longitudinally disposed shift stop plate supported on the said carriage in parallel and spaced relationship with the said shift rack, the said stop plate having relatively wide teeth provided with chamfered edges and relatively narrow tooth spaces therebetween corresponding with and disposed symmetrically about the vertical axis of the teeth on the said shift rack, a reversible gear carriage drive assembly for operating the said shift rack, and driving means including a pair of normally open shift clutches adapted to be selectively closed to cause the said reversible gear assembly to shift the said carriage laterally in either direction, a vertically movable shift centralizing plate having a pin thereon adapted to be normally maintained in positive shift stopping and locking engagement with a predetermined tooth space on the said stop plate corresponding with the selected ordinal position of the said carriage, a lever for holding the said centralizing plate in an inactive position out of the range of the coacting tooth space on the said stop plate, and mechanism responsive to the movement of one of the said shift clutches to its closed position for moving the said lever and the said centralizing plate to the said inactive position during a carriage shift operation.

8. In a calculating machine, the combination which comprises a frame, a shiftable register carriage mounted on said frame and provided with a shift operating rack and a shift stop plate, the said stop plate having relatively wide teeth and relatively narrow ordinally spaced vertical slots therebetween, a reversible gear carriage drive assembly for operating the said shift rack, driving mechanism including a normally open shift clutch adapted to be closed to cause the said reversible gear assembly to shift the said carriage laterally in a predetermined direction, a shift control member vertically slidable on the said frame and having a stop pin secured to the upper portion thereof, a spring normally urging the said shift control member to an active position wherein the said pin is moved into the coacting vertical slot in the said stop plate to establish a positive stopping and locking engagement therewith, a lever operable to hold the said shift control member in an inactive position wherein the said pin is moved out of the range of the coacting slots on the said stop plate during a shift operation, and mechanism operated by the said driving mechanism whenever the said shift clutch is closed for retaining the said shift control member in its inactive position during a carriage shift operation.

9. In a calculating machine having a frame, a shiftable register carriage, means for shifting the said carriage in either direction, cyclically operable power means, connecting means for connecting the said shifting means to said power means for operation of the shifting means selectively in either direction, a shift control member for controlling operation of said connecting means, a centralizing mechanism for the said carriage including an ordinally slotted stop plate on the said carriage and a coacting stopping member on the said frame, resilient power means normally urging the said member into ordinal centralizing engagement with the said stop plate, means for withdrawing the said slide out of the range of the said stop plate, and means controlled by said shift control member for connecting said last-mentioned means to said power means immediately prior to operation of said connecting means.

NATHANIEL F. HAWTHORNE.

References Cited in the file of this patent

UNITED STATES PATENTS

| Number | Name | Date |
|---|---|---|
| 967,821 | Naumann | Aug. 16, 1910 |
| 1,970,512 | Friden | Aug. 14, 1934 |
| 2,216,636 | Webb | Oct. 1, 1940 |
| 2,313,817 | Friden | Mar. 16, 1943 |
| 2,380,642 | Friden | July 31, 1945 |